United States Patent [19]

Albert et al.

[11] Patent Number: 5,166,842

[45] Date of Patent: Nov. 24, 1992

[54] METHOD FOR MINIMIZING TIME FOR ADJUSTING SERVO OFFSETS IN A HARD DISK DRIVE

[75] Inventors: Glenn D. Albert; Jonathan S. Filter, both of Yukon, Okla.

[73] Assignee: Seagate Technology, Inc., Scotts Valley, Calif.

[21] Appl. No.: 486,516

[22] Filed: Feb. 28, 1990

[51] Int. Cl.⁵ .................. G11B 5/596; G11B 5/58
[52] U.S. Cl. .................. 360/77.04; 360/78.04
[58] Field of Search .............. 360/77.04, 77.05, 78.04

[56] References Cited

U.S. PATENT DOCUMENTS

| | | | |
|---|---|---|---|
| 4,268,785 | 5/1981 | Svendsen | 360/78.04 X |
| 4,371,960 | 2/1983 | Kroiss | 369/43 |
| 4,381,526 | 4/1983 | McLaughlin et al. | 360/78 |
| 4,937,689 | 6/1990 | Seaver | 360/78.07 |

OTHER PUBLICATIONS

A. Paton, Correction of Data Track Mistregistration in Servo Controlled Disk Files, Nov. 1974, IBM Technical Disclosures Bulletin, vol. 17, No. 6.

Primary Examiner—Aristotelis Psitos
Assistant Examiner—David L. Robertson
Attorney, Agent, or Firm—Edward P. Heller, III; Bill D. McCarthy; Louis W. Watson

[57] ABSTRACT

A method for effecting a transition from data track following by one data head adjacent one disk of a rotating disk data storage device to data track following by a second data head adjacent a second disk wherein the data tracks are part of a cylinder of tracks including a servo track followed by a servo head with an offset appropriate to each data track. A servo control circuit between the servo head and the coil of an actuator on which the heads are mounted receives a position error signal from the servo head and an offset signal from a microcomputer during following of each track and the transition is effected by adjusting the offset signal in a succession of discrete steps from the offset appropriate for one data head to the offset appropriate to the other data. Steps of the succession can have magnitudes equal to successively selected proportions of the offset signal difference for the two data heads or can vary alternatively between the offset signal difference for the two heads and a zero magnitude.

4 Claims, 2 Drawing Sheets

METHOD FOR MINIMIZING TIME FOR ADJUSTING SERVO OFFSETS IN A HARD DISK DRIVE

BACKGROUND OF THE INVENTION

1. Field of the Invention

The present invention relates generally to improvements in servo control methods for rotating disk data storage devices, and, more particularly, but not by way of limitation, to improvements in methods for effecting transitions between selected offsets of a servo head from a servo track on a dedicated servo surface on a disk of the device.

2. Brief Description of the Prior Art

In rotating disk data storage devices developed to store large amounts of data received from a computer, it is common practice to mount a plurality of hard disks, each having a magnetic coating on both sides, on a common spindle to be rotated together. A movable actuator adjacent the disk stack supports a plurality of data heads adjacent selected surfaces—data surfaces—formed by the magnetic coatings and the actuator is controlled by a servo control circuit to radially position the data heads so that the data heads will overlie, or follow, selected circular data tracks defined on the data surfaces.

In one type of device in widespread use, the servo control circuit receives position error signals from a servo head adjacent one surface—a dedicated servo surface—of one disk and positions the actuator to position all heads, data and servo alike, in unison to effect following of the data tracks by the data heads via following of servo tracks magnetically written on the dedicated servo surface. To this end, the servo head and the data heads are arranged along a line parallel to the rotation axis of the disk and the data and servo tracks are grouped into coaxial cylinders centered on such rotation axis. Thus, positioning of the servo head to follow a selected servo track will cause each data head to follow the data track on the surface adjacent the data head that is contained in the same cylinder as the selected servo track.

A difficulty that occurs in this type of device is that the alignment of the data and servo heads necessary for data track following to be accomplished by servo track following cannot be maintained within allowable tolerances for reading and, more particularly, writing a data track. The spacing between radially successive cylinders is often less than a thousandth of an inch so that, when the width of the heads and consequently the data tracks, is taken into account, control of the radial position of the data heads must be effected to a tolerance measured in microinches to prevent a data head from reading or writing to a data track adjacent the track that is being followed. Thus, a very small misalignment between a data head and the servo head can result, for example, in overwriting of one data track, to destroy the data thereon, during writing to an adjacent data track. Such misalignments can occur in a number of ways; for example, through differential thermal expansion of the disks or of arms on which the data heads and the servo head are mounted, by mechanical shock experienced by the device to cause small realignments of connections between the arms and the actuator, and so on.

A solution to this misalignment problem has been described in "Correction of Data Track Misregistration in Servo Controlled Disk Files", by A. Paton, IBM Technical Disclosure Bulletin, Volume 17, Number 6, pages 1781 through 1783, published in November 1974. As disclosed in this bulletin, the teachings of which are hereby incorporated by reference, servo tracks are written to the data surfaces to be read while the servo head follows a servo track on the dedicated servo surface to determine the offsets between the data tracks and the data heads during track following by the servo head and these offsets are saved and used to generate offset signals that are transmitted to the servo control circuit when data tracks are followed. These offset signals will cause the actuator to offset the servo head from a servo track by an amount that is just sufficient to correct for the misalignment between a selected data head and the servo head with the result that the data head follows the data track.

While this solution for correcting misalignment of the data heads and the servo head has worked well, it is an incomplete solution to the problems that arise from the misalignment. In particular, the misalignment also has a deleterious effect on the transfer rate of data to and from the disks of the device. The amount of data to be stored on or recovered from a disk will often exceed the amount that can be stored on one data track and, in such cases, the transfer rate can be maximized by storing the data on first one track of a given cylinder and then proceeding to a second track on the same cylinder. Thus, large adjustments of the actuator from one cylinder to the next that take large amounts of time are made only when a cylinder has been completely written or a new file is read or stored. For this approach to maximize transfer rate, it is important that the transition between track following by one data head to track following by another be made as quickly as possible. However, a change in the offset of the servo head from the servo track on the same cylinder as the two data tracks must be effected prior to commencing reading or writing by the second data head. In the past, this offset change requirement has limited data transfer rates by requiring that sufficient time be allowed after the offset signal has been changed to enable stable track following by the second data head to occur.

SUMMARY OF THE INVENTION

The present invention solves the problem of reduced transfer rate arising from the settle time of a data head on a data track following a change in the offset signal transmitted to the servo control circuit. In particular, the present invention contemplates a method for effecting the change in the offset signal that will result in a shift from track following by one data head to track following by a second data head on the same cylinder in substantially the minimum time required to move the actuator that supports the head consistent with the maximum offset signal that can be supplied to the servo control circuit. To this end, the offset signal is adjusted in a succession of discrete steps from the value selected for one data head and surface for the value selected for the other data head and surface.

In one embodiment of the invention, the succession of steps are selected to have magnitudes equal to successively selected proportions of the difference in the two selected offset signals and in such case, the actuator is initially driven toward the case for track following by the second head followed by steps that drive the actuator toward intermediate locations for the second head that tend to brake the actuator as track following by the second head is approached. Thus, the second head is caused to move smoothly to the second data track without overshoot so that the transition from track following by the first head to track following by the second head occurs in a minimum time.

In a second embodiment of the invention, the steps of the succession alternatively have the magnitude of the difference in offsets selected for the two data heads and a magnitude of zero to again provide a braking effect as the second data head nears the second data track. Such effect limits overshoot of the second data track by the second data head and thereby establishes substantially stable track following in essentially the minimum time required for the movement of the actuator consistent with the capabilities of the servo control circuit.

An object of the invention is to maximize the transfer rate of data to and from a rotating disk data storage device.

Another object of the present invention is to limit the time required to effect a transition from stable track following of one data track on one data surface by one data head of a rotating disk data storage device to stable track following of a second data track on a second data surface by a second data head of the device.

Other objects, features and advantages of the present invention will become apparent from the following detailed description when read in conjunction with the drawings and appended claims.

DESCRIPTION OF THE FIG. 1

Figure 1:
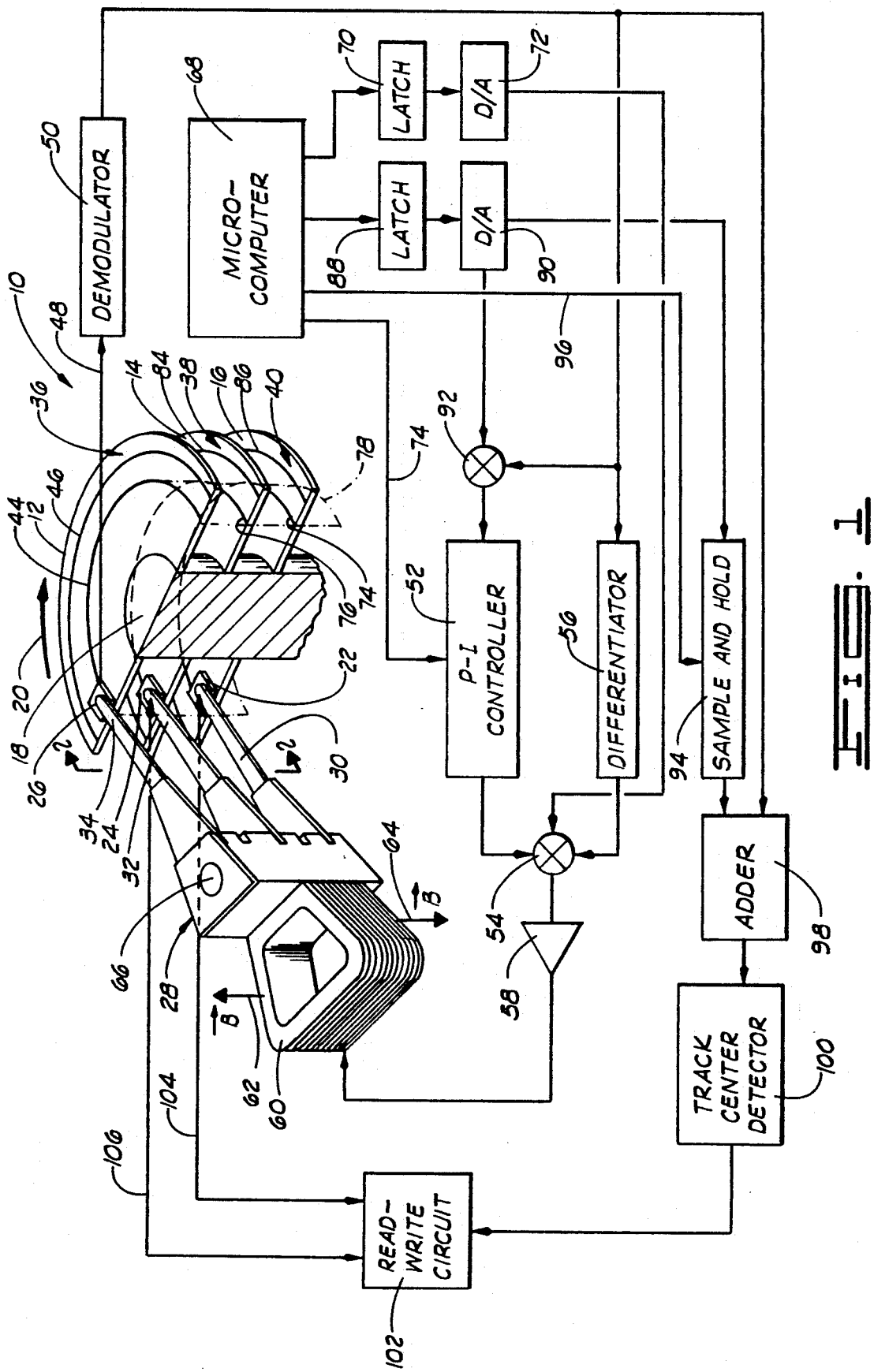
FIG. 1 is a schematic representation of a rotating disk data storage device constructed in accordance with the practices of the present invention.

Referring now to the drawings in general and to FIG. 1 in particular, shown therein and designated by the general reference numeral 10 is a schematic representation of a rotating disk data storage device constructed in accordance with practices of the present invention. As is conventional, the device 10 is comprised of a plurality of disks 12, 14, and 16 that are mounted coaxially on a spindle 18 for rotation in the direction indicated by the arrow 20 and the device 10 further comprises a plurality of data heads 22, 24 and a servo head 26 that are mounted, via arms 30, 32 and 34 respectively, on a pivotable actuator 28 that radially positions the heads 22, 24 and 26 adjacent surfaces 36, 38 and 40 on the disks 12, 14 and 16. (For clarity of illustration, only selected disks and data heads have been shown in FIGS. 1 and 2.) As is conventional and as is shown in FIG. 2, both sides of the disks 12 through 16 are provided with magnetic coatings 42 and the heads 22 through 26 are constructed to magnetize the coatings in response to write currents received thereby and to read magnetic flux transitions between adjacent, oppositely magnetized regions of the coatings for the recovery of information stored in the device 10.

In the practice of the present invention, it is contemplated that the radial position of only the servo head 26 will be directly controlled during the operation of the device 10 and it will be useful to consider such control as a basis for a discussion of the invention. The upper surface 36 of the disk 12 is selected as a dedicated servo surface and servo patterns are magnetically written thereon as, for example, disclosed in U.S. Pat. No. 4,811,135 issued Mar. 7, 1989 to Janz. As disclosed therein, the servo patterns are organized in a series of concentric servo tracks, two of which have been shown in FIG. 1 and designated by the numerals 44 and 46 therein. As a servo track passes beneath the servo head in a track following mode of operation of the device 10, flux transitions on the servo track being followed generate an emf in the servo head and such emf is transmitted via conducting path 48 to a demodulator 50 that generates a servo track position error signal that is proportional to the displacement of the center of the servo head from the center of the servo track as described in the aforementioned U.S. Pat. No. 4,811,135. The servo track position error signal is supplied to a servo control circuit (not numerically designated in the drawings) comprising a proportioning and integrating, or P-I, controller 52 that provides a position correction signal proportional to both the servo track position error signal and its integral to a summing junction 54. The servo track position error signal is further transmitted to a differentiator 56 that provides a velocity correction signal proportional to the radial velocity of the servo head across the servo surface 36 to the summing junction 54 and the sum of the correction signals is transmitted to a power transconductance amplifier that adjusts the current through a coil on the end of the actuator 28 opposite the end whereon the heads 22 through 26 are mounted. The sides of the coil 60 are immersed in oppositely directed magnetic fields, indicated by the arrows 62 and 64 so that the current through the coil 60 gives rise to a force on the coil 60 to turn the actuator 28 about a pin 66 whereon the actuator 28 is mounted. Additionally, the device 10 is comprised of a microcomputer 68 that can provide a velocity demand profile to the summing junction 54, via a latch 70 and D/A converter 72 in a seek mode of operation of the device 10 in which the servo head is moved between different servo tracks on the surface 10. (In the seek mode, the P-I controller 52 is disabled by a signal supplied by the microcomputer 68 on a conducting path 74.)

The radial positions of the data heads 22 and 24 are controlled by the common support of all heads 22-26 on the actuator 28. That is, radial positioning of the servo head 26 by the servo control circuit concurrently effects radial positioning of the data heads 22 and 24. Thus, circular data tracks, 74 and 76, can be defined for the data heads 22 and 24 respectively to lie on a cylinder 78 that includes the servo track 44 and following of the servo track 44 by the servo head 26 will result in following of the data track 74 by the data head 22 and following of the data track 76 by the data head 24. Other data heads, not shown, will similarly follow data tracks defined on other disk surfaces to lie on the cylinder 78.

Figure 2:
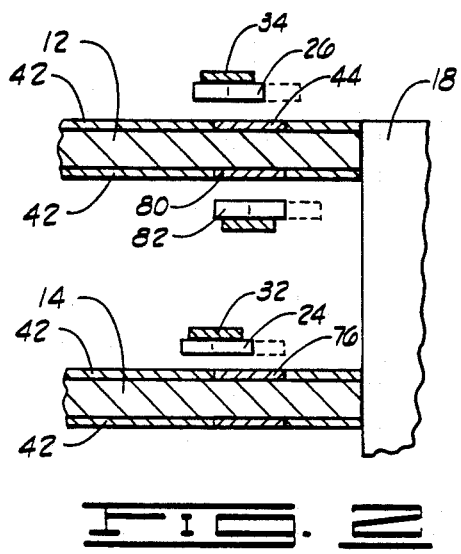
FIG. 2 is an enlarged cross section of selected disks of the device taken along line 2—2 of FIG. 1.

A problem with this type of data track following has been illustrated in FIG. 2 wherein portions of the disks 12 and 14 adjacent the tracks 44 and 76 respectively have been shown. FIG. 2 also illustrates a data track 80, on the cylinder 78, on the underside of the disk 12 and a data head 82 (not shown in FIG. 1) that is mounted on the actuator 28 in the same manner as the heads 22 through 26 are mounted thereon. As shown in FIG. 2, the data heads 22, 24 and 82 can become misaligned with the servo head 26 because of mechanical shocks delivered to the device 10 or even because of temperature differences that exist between various locations on the disk stack, the actuator and head support arms. While the misalignment is small, the close spacing of tracks on disks of modern data storage devices requires that the radial positions of the data heads be controlled to tolerances that are measured, as noted above, in microinches if reading by a data head of a track adjacent that being followed or writing to such an adjacent track is to be prevented.

The misalignment of the data heads 24, 82 with the servo head 26 causes a failure of data track following during servo track following so that, if no compensation is made for the misalignment of the heads, data stored on a track adjacent the track to be read may mix with the data to be resulting in read errors. Worse, writing to one data track may overwrite an adjacent track to destroy data that has been stored on such track. The solution to these problems that has been described in the aforementioned IBM Technical Bulletin is to offset the servo head 26 from the servo track 44 as shown in FIG. 2 so that the data head that is to read or write follows the data track from which data is read or to which data is to be written. Thus, if data is to be read from or written to the data track 80 in FIG. 2 and the data head 82 is misaligned to the right of the servo head 26, the servo head 26 is offset to the left of the servo track 44 as shown in solid lines in FIG. 2. If, on the other hand, the data head is misaligned to the left of the servo head, as shown for the data head 24 adjacent the data track 76, the servo head 26 is offset to the right of the servo track 44 so that the data head 24 will follow the track 76 as shown in dashed lines in FIG. 2.

Referring once again to FIG. 1, this mode of compensation is effected by writing a servo track, having a format similar to that of the servo tracks 44, 46, on each of the data surfaces, the servo tracks on the surfaces 38 and 40 being designated by the numerals 84 and 86 respectively in FIG. 1. The tracks 84 and 86 are written at a radius that is the same as the radius of the servo track 46 on the servo surface 36 so that the tracks 84 and 86 can be read by following the servo track 46. During such following, the signals generated in the data heads are used to determine the offsets of the heads 22 and 24 from the centers of the tracks 84 and 86 while the servo head is following the servo track 44. Thus, appropriate values of offset of the servo head 26 from a servo track to cause a selected data head to follow a data track are measured and such values are stored in the microcomputer 68. Such values may be periodically updated to compensate for head misalignment that varies with time; for example, head misalignment arising from temperature differences of various parts of the device 10 or changes in temperature unequally affecting elements of the device 10 having different coefficients of thermal expansion.

To make use of the offsets so determined, the microcomputer 68 outputs an offset signal appropriate to the data surface being read or written to the P-I controller 52 via a latch 88, a D/A converter 90 and a summing junction 92 which is interposed between the demodulator 50 and the P-I controller 52. For a purpose to be described in more detail below, the D/A converter also outputs the offset signal to a sample and hold circuit 94 that can be caused to sample and subsequently hold the signal at its input by a latch signal provided by the microcomputer 68 on a conductor 96. Specifically, the sample and hold circuit holds the signal at its input at the time the latch signal rises until the latch signal drops. In the absence of a latch signal, the sample and hold circuit merely transmits the signal at its input. The output of the sample and hold circuit 94, referred to herein as an offset sample signal, is transmitted to an adder 98 which also receives the servo track position error signal from the demodulator 50 and combines the offset sample signal and the servo track position error signal into a data track position error signal that is indicative of the displacement of the data head for which the offset sample signal has been generated from the corresponding data track to be read or to which data is to be written. The output of the adder is transmitted to a conventional track center detector 100 which provides a signal to a conventional read/write circuit 102 to disable the read/write circuit 102 when the signal at the input of the track center detector exceeds a preselected threshold value. Reading and writing data is controlled by the read/write circuit 102 in a conventional manner via connections of the circuit 102 to the data heads, as shown at 104 and 106 for the data head 22 and 24 respectively, so that disablement of the read/write circuit 102 prevents writing to the data surfaces.

OPERATION

Figure 4:
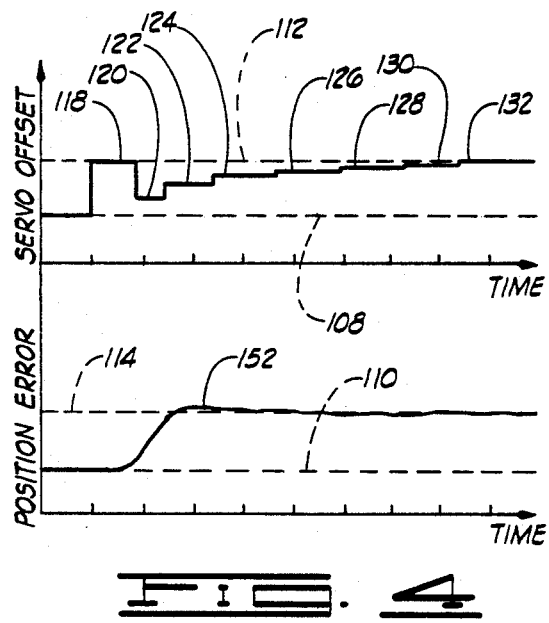
FIG. 4 is a graph of servo offset signal and servo track position error signal for two selected data heads with respect to time for the case in which an offset transition is effected in accordance with one embodiment of the method of the present invention.
Figure 5:
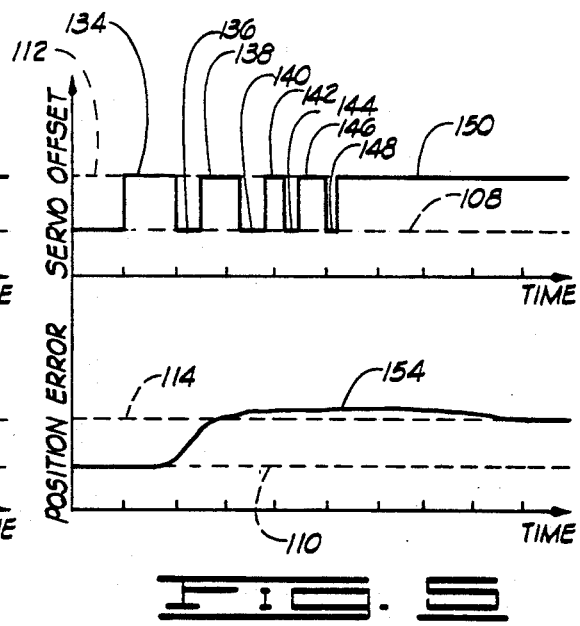
FIG. 5 is a graph of servo offset signal and servo track position error signal for two selected data heads with respect to time for the case in which an offset transition is effected in accordance with a second embodiment of the method of the present invention.

The operation of the device 10 in accordance with the present invention has been illustrated in FIGS. 4 and 5 which present plots of both the servo offset signal and the servo track position error signal as functions of time during a transition from data track following by one data head to data track following by a second data head for two embodiments of the invention. For contrast, FIG. 3 has been included to present the same plots for the case in which the invention is not used.

Figure 3:
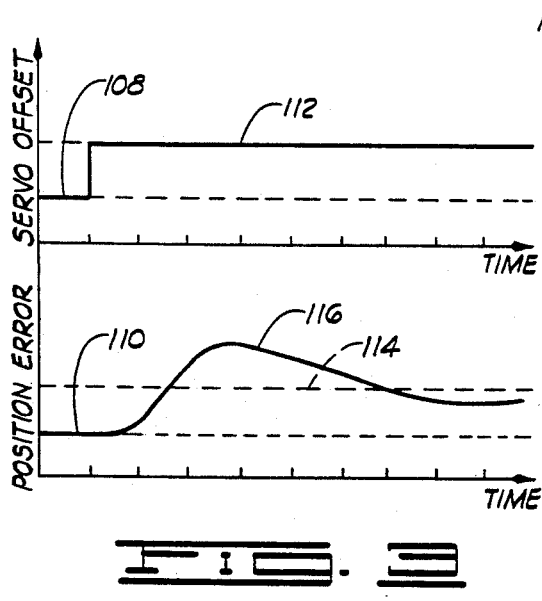
FIG. 3 is a graph of servo offset signal and servo track position error signal for two selected data heads with respect to time for the case in which an offset transition is effected in a single step.

Referring first to FIG. 3, such figure contemplates that the servo head 26 is initially following, with an offset, the servo track on 44 on the cylinder 78 and the offset signal provided by the latch 88 and D/A converter 90 to the P-I controller has a value indicated by the line 108 to cause the data head 24 to be radially aligned with data track 76. The servo track position error signal in such case will have the same value as the offset signal, as shown at 110, so that the servo control circuit comprised of the P-I controller 52 and differentiator 56 will provide small correction signals to the amplifier 58 that will maintain the offset of the servo head 26 from the servo track 44 that will cause stable following of the data track 76 by the data head 24. At such time that it becomes necessary to discontinue following the data track 76; for example, when the track 76 becomes completely filled with data during the storage of data, a transition is made to radially align a second data track on the cylinder 78 with the data head adjacent the surface whereon such track is formed to continue the store or recall operation at hand. For purposes of illustration, it will be assumed that the data head 22 is to be radially aligned with the data track 74. In general, the appropriate offset signal to be supplied to the P-I controller 52 to offset the servo head 26 sufficiently to cause radial alignment of the data head 22 with the data track 74 will differ from the offset signal required for radial alignment of the data head 24 with the data track 76. Thus, a new offset signal indicated by the line 112 in FIG. 3 and corresponding to the servo track position error signal indicated in dashed line at 114 is required to achieve stable data track following by the data head 22.

In the past, the change in the offset signal has been effected by merely changing the offset signal value entered into the latch 88 by the microcomputer 68 at the time the transition between data heads is to be made. The result is illustrated by the variation of the servo head position error signal in the lower diagram in FIG. 3. The servo head 26 will, in response to a transition in the form of a step, overshoot the offset position that corresponds to centering of the data head 22 on the data track 74 as shown at 116 so that operation of the data head 24 to read or write data cannot be commenced for a time which is long in comparison with the time required for the movement of the data head 22 to the data track 74. Thus, the transfer rate of data to and from the disk drive is lowered by the necessity to allow a relatively long settle time for each transition of track following from one track of a cylinder to track following of a second track of the cylinder. (As is known in the art, the data tracks are angularly skewed to permit reading and writing to a new track to commence upon the achievement of stable track following by a new track. Thus, the second data head will be angularly positioned with respect to the disks to commence reading or writing when the transition has been completed. In the case shown in FIG. 3, large skew angles are required to compensate for the excessive settle time.)

FIGS. 4 and 5 illustrate two embodiments of the method of the present invention for effecting a transition from radial alignment of one data head with a data track on one data surface to radial alignment of a second data head with a second data track, in the same cylinder as the first data track, on a second disk. Again, for purposes of example, it will be assumed that the first data head is the data head 24 and the second data head is the data head 22. Correspondingly, the first and second data tracks are the tracks 76 and 74 respectively. Thus, the change in the servo offset signal in either case is to be between the values 108 and 110 as indicated by the dashed lines in FIGS. 4 and 5. Similarly, the servo track position error signal is to change from the value indicated at 110 to the value indicated at 114 in FIG. 3 and such values are indicated by dashed lines so designated in both FIGS. 4 and 5.

In accordance with the present invention, the offset signal is adjusted in a succession of discrete steps as indicated by the steps 118 through 132 in FIG. 4 and by the steps 134 through 150 in FIG. 5. The embodiments differ in the selection of the magnitudes of the steps. In FIG. 4, each step is selected to have a magnitude that is a proportion of the difference in the two offset signals that have been selected for the two data heads. Thus, for example, the magnitudes of the steps 118 through 132 might be, as expressed in percentages of the difference between the values associated with the offset signals indicated at 108 and 112, 100%, 31%, 59%, 76%, 84%, 93%, 97%, and 100%, the last step constituting the completion of the transition. In FIG. 5, each step is effected with a signal having a magnitude equal to one of the offset signals selected for the two data heads. These magnitudes are alternated so that the transition begins and ends with a step that equals the difference between the two offset values selected for the two heads.

It has been found that an appropriate set of steps can be readily determined for any difference in two servo offset signals by an iterative technique following replacement of the microcomputer 68 with an emulator (not shown) connected to a host computer and connection of the output of the demodulator 50 to an oscilloscope. The emulator-host computer combination permits the steps to be selected and adjusted for any selected offset signal difference while the connection of the oscilloscope to the demodulator permits the resulting movement of the servo head to be observed. The steps are then adjusted until a suitable, rapid movement of the servo head from one offset value to the other is obtained as indicated by the curves 152 and 154 in FIGS. 4 and 5 respectively. The iteration is carried out for each of a selection of offset signal values that are typical of the range of values of offset required by a data storage device wherein the method is to be employed and the percentages of the offset signal differences and the times for the steps are stored in the microcomputer for determination of the magnitudes and duration of the steps and subsequent entry of the steps into the latch 88 whenever a transition is to be made.

It will be noted that the curves 152 and 154 both exhibit a rapid movement of servo head 26 between the two offset positions indicated by the servo head position error signals 110 and 114 with very little overshoot of the position corresponding to the servo head position error signal indicated at 114. In particular, it has been found that the transition can be made in substantially the same time that the initial movement between the two offset positions occurs in response to the one step shift shown in FIG. 3. Thus, initial portions of the transition follow substantially the same servo head position versus time curve that is followed in the one step case but the large overshoot that occurs in such case is eliminated. It will further be observed that less overshoot occurs for the case in which the steps are selected to be proportions of the difference in the offset signals for the two heads, as shown in FIG. 4, than in the case in which the steps are alternatively of a magnitude equal to such difference and a zero magnitude. Thus, the method indicated in FIG. 4, is the preferred method. However, in circumstances in which the microprocessor used in the microcomputer 68 is too slow or the system responds too rapidly for the microcomputer to determine the appropriate values to be entered into the latch 88 from the offset percentages while the transition is taking place, the method of FIG. 5, in which the magnitudes of the offset signals to be entered into the latch 88 need not be calculated, provides a suitable alternative.

It will also be noticed that the succession of steps utilized in both of the methods shown in FIGS. 4 and 5 begin with an initial step having a magnitude equal to the difference in the offset signals selected for the two data heads. This characteristic is utilized as will now be explained to enable the read/write circuit 102 as the servo head 26 reaches the offset appropriate to track following for the second data head. In particular, the microcomputer 68 is programmed to provide a latch signal to the sample and hold circuit 94 that rises while the first step of the succession is present in the latch 88 and continues until the conclusion of the succession of steps utilized in the radial repositioning of the data and servo heads. Thus, the sample and hold circuit 94 samples the offset signal at the output of the D/A converter 90 during the first step of the movement of the heads and provides an offset sample signal to the adder that is equal to the servo offset signal for the data head that is to begin track following while the succession of steps are entered into the latch 88. This offset sample signal is combined with the servo track position error signal received from the demodulator to provide a data track position error signal that will be zero whenever the data head selected for track following is radially aligned with the data track to be followed. The data track position error signal is transmitted to the track center detector 100 which disables the read/write circuit 102 until the data head which is to read or write after the transition has reached a position with respect to the new data track that will cause the data track position error signal to fall to a value that is within the limits selected for the track center detector to enable the read/write circuit 102. Thus, reading and writing is enabled as the servo track position error signal reaches a selected value near the value 114 in FIGS. 3 through 5 indicating that the new data head has reached the new data track. Following completion of the succession of steps by means of which the transition is effected, the latch signal to the sample and hold circuit is discontinued so that the sample and hold circuit will transmit the offset signal in the latch 88 continuously to the adder 98 until the next transition to a new data head and data track becomes necessary.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a method for radially aligning data heads of a rotating disk data storage device with data tracks on data storage surfaces formed on substantially coaxial disks of the device by following a servo track formed on a dedicated servo surface on one of the disks with a servo head mounted on an actuator whereon the data heads are mounted, wherein the servo head is offset from the servo track during data track following in response to an offset signal supplied to a servo control circuit that positions the actuator by an amount selected for each data head to compensate for misalignment of the servo head and the data head, a method for minimizing the time for effecting a transition from radial alignment of one data head with a data track on one data surface to radial alignment of a second data head with a data track on a second data surface comprising the step of adjusting the offset signal in a succession of discrete steps from the offset signal selected for said one data surface to the offset signal selected for said second data surface, wherein said succession is characterized as comprising a first step having a magnitude equal to the different in the offset signals selected for the two data heads and the at least one other step applied at a lesser magnitude.

2. The method of claim 1 wherein said succession is further characterized as comprising a plurality of steps following said first step having magnitudes equal to successively selected proportions of the difference in the offset signals selected for the two data heads.

3. In a method for radially aligning data heads of a rotating disk data storage device with data tracks on data storage surfaces formed on substantially coaxial disks of the device by following a servo track formed on a dedicated servo surface on one of the disks with a servo head mounted on an actuator whereon the data heads are mounted, wherein the servo head is offset from the servo track during data track following in response to an offset signal supplied to a servo control circuit that positions the actuator by an amount selected for each data head to compensate for misalignment of the servo head and the data head, a method for minimizing the time for effecting a transition from radial alignment of one data head with a data track on one data surface to radial alignment of a second data head with a data track on a second data surface comprising the step of adjusting the offset signal in a succession of discrete steps from the offset signal selected for said one data surface to the offset signal selected for said second data surface, wherein the steps of said succession alternatively have the magnitude of the difference between the offset signals selected for the two data heads and a zero magnitude.

4. In a method for radially aligning data heads of a rotating disk data storage device with data tracks on data storage surfaces formed on substantially coaxial disks of the device by following a servo track formed on a dedicated servo surface on one of the disks with a servo head mounted on an actuator whereon the data heads are mounted, wherein the servo head is offset from the servo track during data track following in response to an offset signal supplied to a servo control circuit that positions the actuator by an amount selected for each data head to compensate for misalignment of the servo head and the data head, a method for minimizing the time for effecting a transition from radial alignment of one data head with a data track on one data surface to radial alignment of a second data head with a data track on a second data surface comprising the step of:

adjusting the offset signal in a succession of discrete steps from the offset signal selected for said one data surface to the offset signal selected for said second data surface;

wherein the data storage device is further characterized as having demodulator means for generating a servo track position error signal indicative of the location of the servo head with respect to a selected servo track and track center detector means for disabling reading and writing by data heads in response to a signal exceeding a selected magnitude; and wherein the method further comprises:

selecting the first step of said succession to have a magnitude equal to the difference in offset signals selected for said first and second data surfaces, whereby the offset signal provided in said first step is the offset signal selected for said second data surface;

sampling the offset signal during said first step of the succession to provide an offset sample signal equal in magnitude to the offset signal selected for the second data track;

combining the offset sample signal with the servo track position error signal to generate a data track position error signal indicative of the location of the second data head with respect to the second data track; and supplying the data track position error signal to the track center detector means.

* * * * *

UNITED STATES PATENT AND TRADEMARK OFFICE
CERTIFICATE OF CORRECTION

PATENT NO. : 5,166,842

DATED : November 24, 1992

INVENTOR(S) : Glenn D. Albert & Jonathan S. Filter

It is certified that error appears in the above-indentified patent and that said Letters Patent is hereby corrected as shown below:

Column 9, line 61, delete "different" and substitute therefor --difference--

Signed and Sealed this

Fourth Day of January, 1994

Attest:

BRUCE LEHMAN

Attesting Officer     Commissioner of Patents and Trademarks